United States Patent [19]
Kaiser

[11] Patent Number: 5,876,553
[45] Date of Patent: Mar. 2, 1999

[54] APPARATUS FOR FORMING REINFORCING STRUCTURAL REBAR

[75] Inventor: Mark A. Kaiser, Elida, Ohio

[73] Assignee: Marshall Industries Composites, Inc., Lima, Ohio

[21] Appl. No.: 935,518

[22] Filed: Sep. 23, 1997

Related U.S. Application Data

[63] Continuation of Ser. No. 528,362, Sep. 14, 1995, abandoned, which is a continuation-in-part of Ser. No. 467,157, Jun. 6, 1995, Pat. No. 5,593,536, which is a continuation of Ser. No. 267,565, Jun. 28, 1994, abandoned.

[51] Int. Cl.$^6$ .......................... B65H 81/00; B65H 81/06; B32B 31/00

[52] U.S. Cl. .......................... 156/433; 156/180; 156/441; 156/500; 156/580; 156/581; 156/583.1; 264/136; 264/137

[58] Field of Search ...................................... 156/180, 166, 156/242, 245, 433, 441, 500, 580, 581, 583.1; 264/136, 137, 135

[56] References Cited

U.S. PATENT DOCUMENTS

| | | |
|---|---|---|
| T101,401 | 1/1982 | Zion . |
| 3,235,429 | 2/1966 | Boggs .................................. 156/441 X |
| 3,769,127 | 10/1973 | Goldsworthy et al. ............. 156/425 X |
| 3,793,108 | 2/1974 | Goldsworthy . |
| 3,853,656 | 12/1974 | McNeely et al. .................... 156/441 X |
| 4,276,337 | 6/1981 | Coonrod . |
| 4,440,593 | 4/1984 | Goldsworthy . |
| 4,445,957 | 5/1984 | Harvey . |
| 4,462,946 | 7/1984 | Goldsworthy . |
| 4,481,056 | 11/1984 | Kuhl .................................... 156/441 X |
| 4,620,401 | 11/1986 | L'Espérance et al. . |

(List continued on next page.)

FOREIGN PATENT DOCUMENTS

| | | |
|---|---|---|
| 0 105 809 A2 | 4/1984 | European Pat. Off. . |
| 0 291 023 A2 | 5/1988 | European Pat. Off. . |
| 0514718A1 | 11/1992 | European Pat. Off. . |
| 0 560 362 A2 | 9/1993 | European Pat. Off. . |
| 0 579 163 A2 | 1/1994 | European Pat. Off. . |
| 0612607 | 8/1994 | European Pat. Off. ............... 156/180 |
| 3703974 A1 | 8/1988 | Germany . |
| 61-235 115 A | 10/1986 | Japan . |
| 53-09750 | 11/1993 | Japan . |

OTHER PUBLICATIONS

"C–Bar Composite Offered to Solve Corrosion Problems Fiber Reinforced Plastic (FRP) Rebar For Concrete Also Uses Green Materials"; *Composite New: InFrastructure;* (14 Feb. 1995).

Database WPI; Week 9401; *Derwent Publications Ltd.;* London, GB.

*Primary Examiner*—Jeff H. Aftergut
*Attorney, Agent, or Firm*—Myers Bigel Sibley & Sajovec

[57] ABSTRACT

An apparatus for forming reinforcing structural rebar comprises: resin supply means for supplying a first resin; a first shaping die; means for impregnating a first reinforcing material with the first resin; means for pulling the resin-impregnated first reinforcing material through the shaping die to form the core of the structural rebar; material applying means for applying material for the outer cladding of the structural rebar to the core; and mold means for molding the outer cladding layer into a desired configuration on the core. The material applying means for applying the outer cladding includes means for applying an inner cladding layer over the core and means for applying an outer cladding layer over the inner layer. The inner cladding layer includes a second thermosetting resin containing a second reinforcing material, and the inner cladding layer applying means is configured so that the second reinforcing material is applied substantially unidirectionally along the longitudinal axis of the core. The outer cladding layer comprises a corrosion-resistant third thermosetting resin and a third reinforcing material contained therein.

16 Claims, 2 Drawing Sheets

U.S. PATENT DOCUMENTS

| | | |
|---|---|---|
| 4,681,722 | 7/1987 | Carter et al. . |
| 4,752,513 | 6/1988 | Rau et al. . |
| 4,804,427 | 2/1989 | Paul et al. . |
| 4,876,143 | 10/1989 | Sugita et al. . |
| 4,883,552 | 11/1989 | O'Connor et al. . |
| 4,892,600 | 1/1990 | Beever . |
| 5,047,104 | 9/1991 | Preis et al. . |
| 5,077,113 | 12/1991 | Kakihara et al. . |
| 5,084,221 | 1/1992 | Matsuno et al. . |
| 5,098,496 | 3/1992 | Breitigam et al. . |
| 5,114,633 | 5/1992 | Stewart . |
| 5,156,787 | 10/1992 | Booher . |
| 5,182,064 | 1/1993 | Ishizuka et al. . |
| 5,322,582 | 6/1994 | Davies et al. ............ 156/180 |
| 5,324,377 | 6/1994 | Davies ................ 156/180 |
| 5,421,931 | 6/1995 | Carmien ............ 156/166 X |
| 5,593,536 | 1/1997 | Kaiser . |

APPARATUS FOR FORMING REINFORCING STRUCTURAL REBAR

RELATED APPLICATIONS

This application is a continuation of application Ser. No. 08/528,362, filed Sep. 14, 1995, now abandoned, which is a continuation-in-part application of U.S. patent application Ser. No. 08/467,157, now U.S. Pat. No. 5,593,536 which is a continuation application of U.S. patent application Ser. No. 08/267,565, filed Jun. 28, 1994, now abandoned, the disclosure of which is hereby incorporated herein by reference in its entirety.

FIELD OF THE INVENTION

The present invention relates to an apparatus for making reinforcing structural rebar. More particularly, the present invention relates to an apparatus for making reinforcing structural rebar comprising a pultruded core of a thermosetting resin and an outer cladding layer.

BACKGROUND OF THE INVENTION

It is well known that pultrusion processes are effective continuous processes for producing articles of constant cross-section. Conventional pultrusion processes involve drawing a bundle of reinforcing material (e.g., glass filaments or fibers) from a source thereof, wetting the fibers and impregnating them (preferably with a thermosettable polymer resin) by passing the reinforcing material through a resin bath in an open tank, pulling the resin-wetted and impregnated bundle through a shaping die to align the fiber bundle and to manipulate it into the proper cross-sectional configuration, and curing the resin in a mold while maintaining tension on the filaments. Because the fibers progress completely through the pultrusion process without being cut or chopped, the resulting products generally have exceptionally high tensile strength in the longitudinal (i.e., in the direction the filaments are pulled) direction. Exemplary pultrusion techniques are described in U.S. Pat. Nos. 3,793,108 to Goldsworthy; 4,394,338 to Fuway; 4,445,957 to Harvey; and 5,174,844 to Tong. Exemplary pultruded articles include tool handles, mine shaft bolts, pipes, tubing, channel, beams, fishing rods and the like.

Of particular interest is the manufacture of fiber reinforced rods or bars ("rebar"). Such bars are often used in cementitious mixtures, such as concrete, as reinforcing members. Concrete typically has a high compressive strength, but is relatively weak in tension, so the inclusion of high-tensile strength rebar beams enhances the tensile strength, and thus the overall performance, of the concrete considerably. Fiber-reinforced rebar has drawn attention because some compositions are corrosion-resistant and thus potentially offer a solution to the corrosion problem that has plagued steel rebar in concrete. An exemplary corrosion-resistant fiber-reinforced rebar, disclosed in co-pending U.S. patent application Ser. No. 08/467,157, comprises a fiber reinforced thermoset core and an outer cladding formed of sheet molding compound (SMC).

Because different cement and concrete compositions and structures can have different performance and cost parameters, it is desirable to provide different compositions of fiber-reinforced rebar to meet these different demands. With different rebar compositions come different equipment concerns, particularly for continuous manufacture of such compositions.

In view of the foregoing, it is an object of the invention to provide an apparatus combining a pultrusion apparatus and an apparatus for molding an outer cladding on rebar.

It is another object of the invention to provide an apparatus for making reinforcing structural rebar comprising a pultruded core of a thermosetting resin and an outer cladding thereon.

Other objects, features, and advantages of the invention will be particularly identified below.

SUMMARY OF THE INVENTION

These and other objects are satisfied by the present invention, which includes an apparatus for forming reinforcing structural rebar having a core of a resin containing reinforcing material and an outer cladding. The apparatus comprises: resin supply means for supplying a first resin; a first shaping die;means for impregnating a first reinforcing material with the first resin; means for pulling the resin-impregnated first reinforcing material through the shaping die to form the core of the structural rebar; material applying means for applying material for the outer cladding of the structural rebar to the core; and mold means for molding the outer cladding layer into a desired configuration on the core. The material applying means for applying the outer cladding includes means for applying an inner cladding layer over the core and means for applying an outer cladding layer over the inner layer. The inner cladding layer includes a second thermosetting resin containing a second reinforcing material, and the inner cladding layer applying means is configured so that the second reinforcing material is applied substantially unidirectionally along the longitudinal axis of the core. The outer cladding layer comprises a corrosion-resistant third thermosetting resin and a third reinforcing material contained therein.

In one embodiment, the outer cladding layer applying means comprises an injection unit for injecting the third resin material onto the inner cladding layer and a sleeve having an aperture within which the core, inner cladding layer, and outer cladding layer are received. Preferably, the sleeve aperture is configured so that the fibers of the second reinforcing material contained in the inner cladding layer avoid contact with the sleeve as the inner cladding layer passes therethrough, as avoiding such contact reduces the risk of the second reinforcing material receiving a notch or nick that can reduce its strength.

DETAILED DESCRIPTION OF THE INVENTION

The present invention will now be described more fully hereinafter. This invention may, however, be embodied in many different forms and should not be construed as limited to the embodiment set forth herein; rather, this embodiment is provided so that this disclosure will be thorough and complete, and will fully convey the scope of the invention to those skilled in the art.

Figure 1:
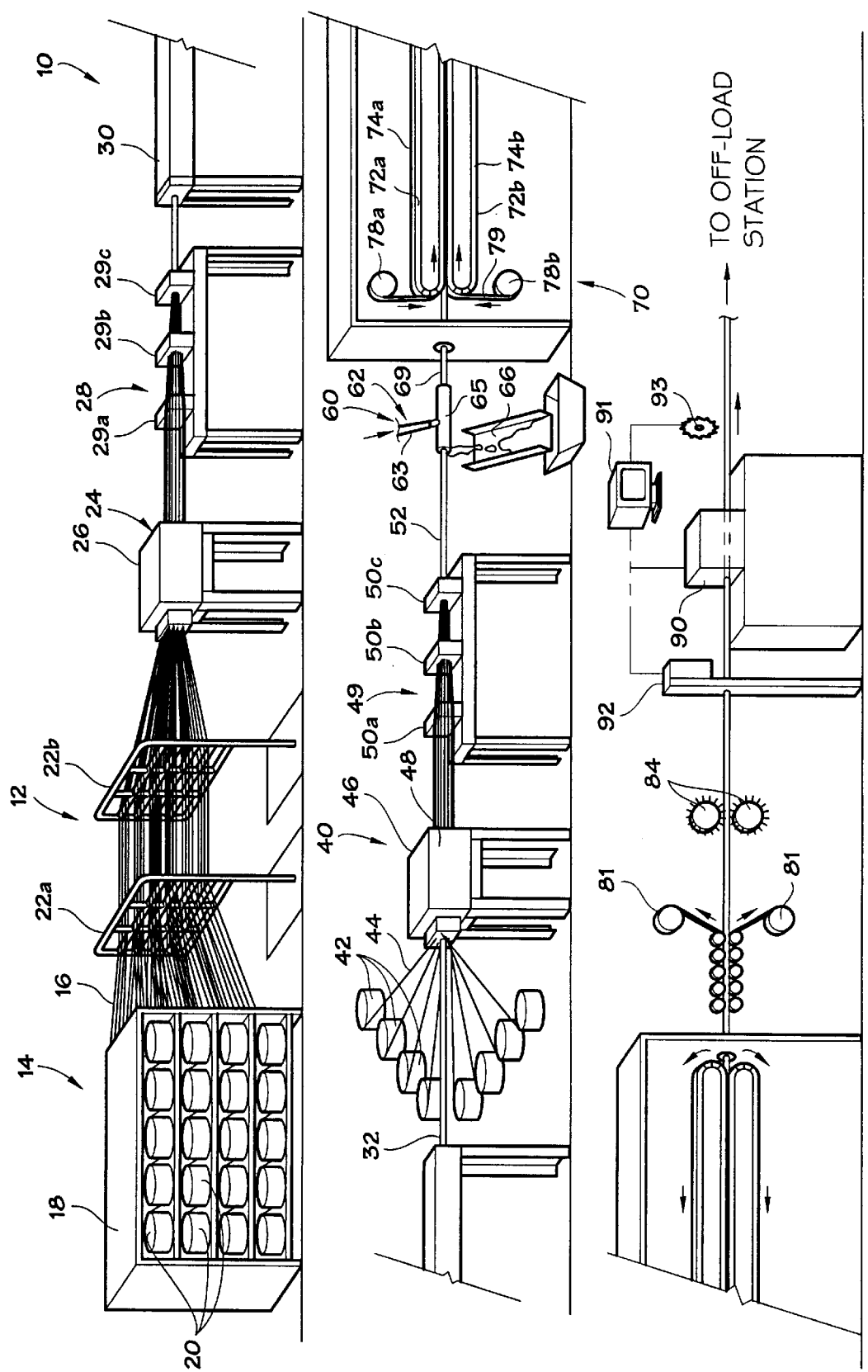
FIG. 1 is a diagrammatic and schematic illustration of the apparatus of the present invention.
Figure 2:
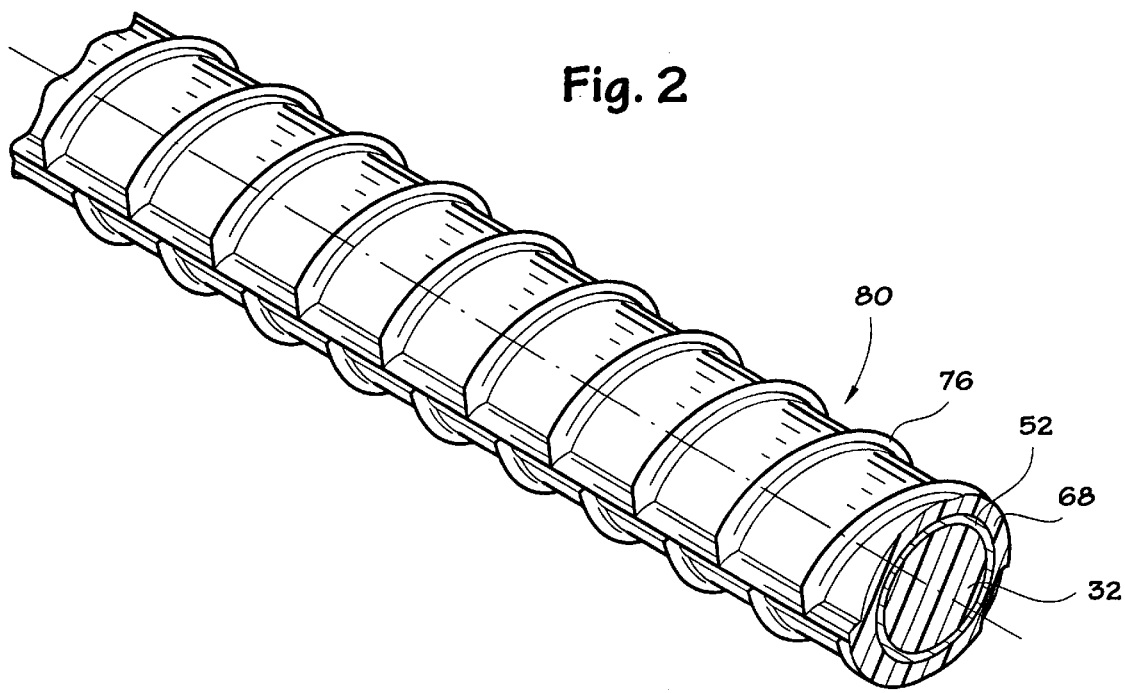
FIG. 2 is a perspective view of the reinforcing structural rebar made using the apparatus of the present invention.

As shown in FIG. 1, the apparatus 10 of the present invention includes a pultrusion station 12, an inner cladding layer station 40, an outer cladding layer station 60, and a molding station 70. The apparatus 10 is used to make a reinforcing structural rebar 80 (FIGS. 2 and 3) comprising an inner core 32 of thermosetting resin and an outer cladding 82 of sheet molding compound. A specific reinforcing structural rebar construction is described in commonly assigned U.S. patent application Ser. No. 08/527,976 filed concurrently, having Attorney Docket No. 5560-6, the disclosure of which is incorporated by reference in its entirety.

Pultrusion Station

The pultrusion station 12 includes a reinforcing material supply 14, a bath 26 of a thermosetting resin or other thermosetting resin supply means and a shaping die 30 (FIG. 1). The reinforcing material supply 14 comprises a plurality of reinforcing material 16 on a plurality of spools 20 mounted on a storage rack, such as the bookshelf style creel 18 illustrated in FIG. 1. The reinforcing material 16 comprises fibers selected from the group consisting of fibers of glass, carbon, metal, aromatic polyamides, polybenzimidazoles, aromatic polyimides, polyethylene, nylon, and blends and hybrids thereof. These fibers are supplied in the form of a roving, mat, veil, fabric or the like. Typically, the reinforcing material is E-glass fibers in the form of a roving. The creel 18 can include virtually any number of spools 20; creels including 100 or more spools are common. Preferably, the reinforcing material 16 is drawn from the spools 20 through a series of ceramic bushings (not shown) positioned at the front of the creel 18 to maintain alignment and reduce breakage of the reinforcing material 16.

From the creel 18, the reinforcing material 16 is guided via a pair of creel guides 22a, 22b to the bath 26 (shown in sectional view in FIG. 1) of an unsaturated polyester resin or other thermosetting resin 24 such as vinyl ester resins, polyurethanes, epoxies, and phenolics. The creel guides 22a, 22b control alignment to prevent twisting, knotting or any other damage to the reinforcing material 16. The reinforcing material 16 is directed to the bath 26, wherein the reinforcing material 16 is immersed in and thereby impregnated with a pool of resin 24.

Alternatively, the reinforcing material 16 can be impregnated with thermosetting resin 24 via an apparatus that injects the thermosetting resin 24 onto the reinforcing material 16. Such injection apparatus are known to those skilled in this art, as are other means for impregnating the reinforcing material.

After impregnation, the impregnated reinforcing material (FIG. 1) is formed into the core 32. A forming unit 28 having three alignment cards 29a, 29b, and 29c, is positioned prior to the shaping die 30. The forming unit 28 is preferably included to ensure positive alignment of the impregnated reinforcing material 16 relative to the die 30. If the core 32 is to be tubular, a mandrel and mandrel support extending the mandrel (not shown) can be employed to extend the mandrel in a cantilevered fashion through the pultrusion die while resisting forward drag on the mandrel. Various guide slots, holes, and clearances of the aligning cards 29a, 29b, 29c should be sized to prevent excess tension on the relatively weak and wet material 16, but should also permit sufficient resin removal to prevent viscous drag on the material at the entrance of the shaping die 30 from being too high.

After the forming unit 28, the impregnated resin material 16 may be preheated prior to the shaping die 30 in a radio frequency oven or other suitable heating unit known to those skilled in the art. If so, the impregnated resin material 16 can be uniformly heated throughout its cross-section to reduce the duration that the material must stay in the shaping die 30. Preheating can also enable thick sections of impregnated material 16 to be manufactured without large thermal stresses being created therein due to uneven heat distribution in the material 16. Such thermal stresses can result in microcracking and reduced chemical resistance of the core 32. The shaping die 30 is also preferably heated, as described in *Composites, Engineered Materials Handbook*™, Vol. 1, pp. 534–535 (1989).

Optionally, the impregnated material 16 can then travel through a circumferential winder (not shown) positioned prior to the shaping die 30 which wraps one or more fiberglass layers around the core 32. The fiberglass layers are typically dry. The fibers of the fiberglass layers are typically oriented in a direction other than in the axial direction of the core 32. If dry fiberglass layers are added, preferably, two fiberglass layers are added: one that is placed on the core so that its fibers are oriented at approximately a 45 degree angle to the fibers of the reinforcing material 16, and another that is placed on the core so that its fibers are oriented to be perpendicular to the first wrap and approximately 45 degrees relative to the fibers of the reinforcing material 16. The wrap angles can be controlled by the number of rotational fiber packages added and the speed of the wind and line-speed. The fiberglass layers can add strength to the core, particularly in nonaxial directions. In addition, because the fiberglass layers are added to the core as a fibrous surface, the fibers contained therein remain on the surface of the core 32 as it travels through the shaping die 30. The fibers on the inner surface of the fiberglass layer become imbedded in the core 32 during shaping, while the fibers on the outer surface of the core do not. These outer fibers thus provide a substrate to which the outer cladding 82 can mechanically bond.

Figure 3:
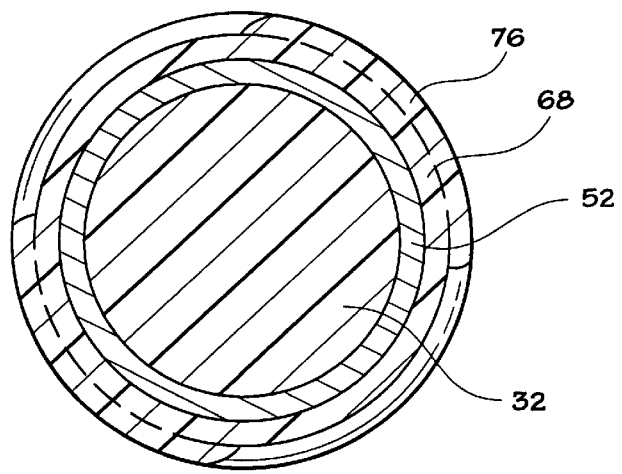
FIG. 3 is a cross-sectional view taken substantially along line 3—3 of FIG. 2 and showing the reinforcing structural rebar.

The impregnated material 16 then proceeds to the shaping die 30 to be formed into the core 32. As it travels through the die 30, the material 16 takes a cross-sectional shape corresponding to the die profile. Illustratively and preferably, the die profile and the resulting core cross-section are circular (FIG. 3). Also, as the material 16 proceeds through the die 30, the thermosetting resin 24 reacts under the heat and pressure generated by the die and partially cures.

A number of different methods and structures can be used to position and anchor the shaping die 30 and to apply the heat necessary to initiate the thermosetting reaction of the resin 24. The use of a stationary die frame with a yoke arrangement that allows the die to be fastened to the frame is the simplest arrangement. In all die-holding designs, the drag force that develops as material is pulled though the die must be transferred to the frame without causing die movement or frame deflection. With a yoke arrangement, heating jackets that employ hot oil or electrical resistance strip heaters are positioned around the die at desired locations. Thermocouples are also placed in the die to control the level of heat applied. Multiple individually-controlled zones can be configured in this manner. This approach is well suited to single-cavity set-ups but becomes more complex when the number of dies used simultaneously increases, as each die requires its own heat source and thermocouple feedback device. Standard heating jackets and heating plates designed to accommodate multiple dies can be used to help alleviate this limitation.

Another popular die station configuration uses heated platens that have fixed zones of heating control with thermocouple feedback from within the platen. The advantage of this method is that all dies can be heated uniformly with reduced-temperature cycling, because changes in temperature are detected early at the source of heat rather than at the load. In the same respect, however, a temperature offset will be common between the platen set point and the actual die temperature. With knowledge of the differential, an appropriate set point can be established. The advantage of quick set-up and replacement of dies stemming from the use of heated platens can lead to increased productivity through reduced down-time, particularly when means to separate the platens automatically are included.

A source of cooling water or air should be included in the front of the die at start-up and during temporary shutdown periods to prevent premature gelation of the resin at the tapered or radiused die entrance. This can be accomplished by using either a jacket or a self-contained zone within the heating platen. Alternatively, the first section of the die can be unheated, and cooling can be accomplished through convection.

A particularly important pultrusion process control parameter is the die heating profile because it determines the rate of the thermosetting reaction, the position of the reaction within the die, and the magnitude of the peak exotherm. Improperly cured materials will exhibit poor physical and mechanical properties, yet may appear identical to adequately cured products. Excess heat input may result in products with thermal cracks or crazes, which destroy the electrical, corrosion resistance, and mechanical properties of the composite. Heat-sinking zones at the end of the die or auxiliary cooling may be necessary to remove heat prior to the exit of the product from the die.

Inner Cladding Layer Station

After exiting the shaping die 30, the partially-cured core 32 enters the inner cladding layer station 40. The inner cladding layer station 40 comprises a plurality of spools 42, each of which stores and presents fibers of reinforcing material 44 for application to the core 32. The reinforcing material 44 comprises fibers selected from the group consisting of fibers of glass, carbon, metal, aromatic polyamides, polybenzimibazoles, aromatic polyimides, polyethylene, nylon, and blends and hybrids thereof. Preferably, the reinforcement material is E-glass fibers in the form of a roving. The reinforcing material 44 is drawn through and impregnated by a thermoseting resin 46 contained in a resin bath 48. The resin 46 is typically an unsaturated polyester resin or other thermosetting resin, such as a vinyl ester resin, polyurethane resin, epoxy resin, or phenolic resin. The resin bath 48 can be similar to the resin bath 26 employed in the pultrusion station 12, can be a "dip bath" configuration, or may take other configurations known to those skilled in this art for impregnating reinforcing fibers.

After exiting the resin bath 48, the reinforcing material 44 proceeds through an alignment station 49, which includes a series of aligning cards 50a, 50b, 50c. The aligning cards guide the reinforcing material 44 onto the circumference of the core 32 to form the inner cladding layer 52 thereon. The aligning cards 50 includes slots, holes, and clearances sized to prevent excess tension on the reinforcement material 44 and also to remove excess resin 46 from the reinforcement material 44. The aligning cards 50a, 50b, 50c and the holes and slots therein are positioned so that the fibers of the reinforcing material 44 are applied unidirectionally substantially parallel to the reinforcing fibers of the core 32; i.e., in the direction the core travels through the aligning cards 50a, 50b, 50c. Those skilled in this art will recognized that other methods and apparatus suitable for applying reinforcing material unidirectionally to the core may also be used with the present invention.

Outer Cladding Layer Station

After exiting the alignment card 50c of the inner cladding layer station 40, the core 32 and inner cladding layer 52 travel to the outer cladding layer station 60. The outer cladding layer station 60 comprises an injection unit 62 and a trough 66. The injection unit 62 includes an inlet 63 that leads to a cylindrical sleeve 65. The sleeve 65 is oriented so that its longitudinal axis is substantially parallel with the longitudinal axes of the core 32 and the inner cladding layer 52. The trough 66 is positioned beneath the upstream end of the sleeve 65.

As the core 32 and inner cladding layer 52 enter the sleeve 65, resin material 64 is injected through the inlet 63 into the sleeve 65. The resin material 64 coats the inner cladding layer 52 thereby forming an outer cladding layer 68. Excess resin material 64 drips into the trough 66. The resin material 64, described in detail in U.S. patent application Ser. No. 08/527,976, Attorney Docket No. 5560-6 filed concurrently, generally is a corrosion-resistant thermosetting resin containing an inorganic reinforcing filler which is preferably a ceramic filler. The resin material 64 preferably includes a thickening agent, such as fumed silica, that increases the viscosity of the resin and thereby helps the filler to remain in suspension in the resin. The resin material 64 should have sufficient viscosity to coat and be retained on the inner cladding layer 52 as it proceeds through the injection unit sleeve 65 and to the molding station 70, but should be sufficiently inviscid to be easily molded by the molding station 70.

It is preferred that the sleeve 65 have an inner aperture dimension (e.g., the inner diameter) such that the inner cladding layer 52 does not contact the sleeve 65 as it travels therethrough. By avoiding contact between the unidirectional fibers of the inner cladding layer 52 and the sleeve 65, the fiber receive no nicks or notches that can increase the notch sensitivity, and thereby decrease the strength, of the rebar 80. Preferably, the sleeve has an inner aperture dimension that is between about 0.025 and 0.100 inches larger than the outer dimension of the inner cladding layer 52 as it passes therethrough.

Molding Station

After exiting the outer cladding layer station 60, the core 32, inner cladding layer 52, and outer cladding layer 68 comprise a premold rod 69. The premold rod 69 enters the molding station 70, wherein the final profile of the outer cladding 82 is formed. Preferably, the core 32 is partially thickened or partially polymerized (i.e., "B-staged") prior to entering the molding station 70, and neither of the inner or outer cladding layers 52, 68 is partially cured.

The molding station 70 includes a pair of endless series of mold halves 72a, 72b mounted on chains 74a, 74b, respectively, which are positioned above and below the premold rod 69. The mold halves 72a, 72b are configured to mold a profile 76 in the outer cladding layer 68. These molds 72a, 72b are preferably male and female molds having a shear edge.

During operation, the chains 74a, 74b rotate in opposite rotational directions (i.e., the chain 74a rotates clockwise as seen in FIG. 1 and the chain 74b rotates counterclockwise). As these conveying units rotate, one of the mold halves 72a contacts and mates with a respective one of the mold halves 72b; in doing so, the halves enclose the premold rod 69. The mating of the mold halves 72a, 72b causes the outer cladding layer 68 to take the contoured shape of the mold. The mold halves 72a, 72b remain in contact as they are conveyed by their respective chains 74a, 74b along the length of the molding station 70. As the mold halves reach the downstream end of the molding station 70, they separate and are redirected to the upstream end of the station 70 to repeat the process. The structural rebar 80 exiting the molding station 70 comprises the core 32, inner cladding layer 52, having unidirectional reinforcing fibers, and the outer cladding layer 68 having ceramic reinforcing material and the outer profile 76.

The mold halves 72a are attached to the chain 74a so that they are in adjacent abutting relationship as they are conveyed during molding. The mold halves 72b are similarly attached to the chain 72b. As a result, the entirety of the outer cladding layer 68 is molded as it travels through the molding station 70 without gaps of unmolded resin material 64 forming between abutting mold halves. In order to ensure that no resin material 64 flashes between abutting mold halves, a continuous outer liner, such as a thin nylon film, can be inserted between the cavities of the mold halves 72a, 72b, and the outer cladding layer 68. This is accomplished by a pair of reels 78a, 78b located at the upstream end of the molding station 70, each of which supplies a nylon strip 79 that resides between the mold halves 72a, 72b and the premold rod 69. The nylon film 79 can be stripped from the premold rod 69 as it exits the downstream end of the molding station 70 by a pair of take-up reels 81.

Operation and positioning of the mold halves 72a, 72b is controlled by structural elements that are mounted either directly or indirectly to an overall station frame. Each of a pair of mold frames is mounted to the station frame via a pair of linear bearings located at either end of the molding frame; the linear bearings enable each chain frame to move vertically but constrain the chain frame from "racking" and thus ensure that the chain frames remain level. A rotating sprocket is mounted to each end of each molding frame and is operably coupled with a drive motor. Each cooperating pair of sprockets engages and drives one of the chains 74a, 74b, thereby causing each of the mold halves 72a, 72b to travel in a flattened elliptical path.

Pressure of a predetermined magnitude can applied to the mold halves 72a, 72b through known pressurizing means. Preferably, pressure is applied through one or more hydraulic pressure units mounted between the molding frames and the station frame.

Preferably, the station frame includes guiding means for controlling the pivotal movement of each mold half 72a relative to its respective chain and to its mating mold half 72b. The guiding means should be configured so that, as mating mold halves 72a, 72b approach one another prior to mating contact, each has rotated to a position in which its mating edges are parallel with the mating edges of the other mating half. Guiding the mold halves into this orientation prevents the outer cladding layer 68 from being pinched by the mold halves as they approach one another. The mold halves 72a, 72b may also include registry means to ensure correct mating alignment between mating halves.

It is also preferred that each mold half 72a, 72b includes a releasable cavity block or other pressure relief means that releases when the pressure within the mold half cavity exceeds a predetermined amount. The cavity block thus provides a fail-safe mechanism by which the mold halves can be protected in the event of undue pressure buildup due to improper registration of the mold halves, contamination in the resin materials, or other malfunctions that unduly increase pressure within the mold cavity.

Heaters can be included in the molding station 70 if the molding process so requires for curing of the core 32 or the inner or outer cladding layers 52, 68. Preferably, the heaters, which can be infrared cathode heaters or other heaters known to those skilled in this art, are positioned to heat the mold halves 72a, 72b, and in particular the mold half cavities, as they return toward the rearward end of the station 70 after completing a molding cycle. The heaters should be configured and angled to deliver sufficient heat to cure the resin material 46 of the inner cladding layer 52 and the resin material 64 of the outer cladding layer 68. Also, the heaters should complete the curing of the partially cured resin material 24 of the core 32.

It is also preferred that the molding station 70 include means for cleaning the mold halves 72a, 72b during the operation. An exemplary cleaning means is a rotary brush system (not shown) mounted to the forward end of the station frame and operably coupled with and responsive to the movement of the chains 74a, 74b that inserts a brush into the mold half cavities and between adjacent mold halves after the release of the molded rebar.

It is preferred that the tension applied to the core 32 that pulls the reinforcing material through the resin bath 26 and the shaping die 30 be provided by the drive motors that drive the chains 74a, 74b; however, the tension may be provided by a remote tensioning device. Further, the molding station 70 may include an auxiliary pulling device that initiates pulling of the reinforcing material but is deactivated once the molding process has reached a steady-state condition, thereby enabling the drive motor to provide the necessary tension for operation.

Illustratively and preferably, a pair of brushes 84 or other flash removal means can be positioned downstream of the take-up reels 81 to remove any unwanted resin material 64 from the rebar 80.

After the premold rod 69 exits the molding station 70 as structural rebar 80, the rebar 80 can be printed using a recirculating ink jet printer 90. A programmable computer 91 and sensor 92 or other control means monitors the length of rebar 80 produced during the process. As a preprogrammed length is reached, a lot code identifying the lot by, for example, physical dimensions and manufacturing date and site, will be printed onto the rebar 80. Lot codes will typically vary depending upon the diameter and material used to process the rods.

As a final step, a flying cut-off saw 93 operably coupled with the computer 91 cuts the rebar 80 to a desired predetermined length. Preferably, the computer 91 is configured to sense the length of the rebar 80 and signal the saw to cut the finished product to lengths as precise as the nearest thirty-second of an inch. The individual rods of rebar 80 are then conveyed to an off-loading station for packaging.

In the specification, there have been disclosed preferred embodiments of the invention. Although specific terms are employed, they are used in a generic and descriptive sense only and not for the purpose of limitation, the scope of the invention being defined by the following claims.

That which is claimed is:

1. An apparatus for forming reinforcing structural rebar comprising a core of a resin containing reinforcing material and an outer cladding, said apparatus comprising:

resin supply means for supplying a first resin;

a first shaping die including a heater;

means for impregnating a first reinforcing material with the first resin;

means for pulling the resin-impregnated first reinforcing material through the shaping die to form the core of the structural rebar such that the first resin is partially cured by said heater;

material applying means for applying material for the outer cladding of the structural rebar to the core, said material applying means including:

means for applying an uncured inner cladding layer over the partially cured core, said uncured inner cladding layer comprising a second thermosetting resin different from said first thermosetting resin containing a second reinforcing material, said second reinforcing material being applied substantially unidirectionally along the longitudinal axis of the core, and means for applying an uncured outer cladding layer over the uncured inner cladding layer, said uncured outer cladding layer comprising a corrosion-resistant third thermosetting resin and a non-unidirectional third reinforcing material contained therein; and mold means for molding the uncured outer cladding layer into a desired configuration on the core, said means for pulling, said means for applying an uncured inner cladding layer, and said means for applying an uncured outer layer being configured such that said inner and outer cladding layers are introduced into said molding means in an uncured condition and wherein said mold means includes a heating element which heats said partially cured core, said uncured inner cladding layer, and said uncured outer cladding layers such that said core, said inner cladding layer, and said outer cladding layers are cured upon exit from said mold means.

2. The apparatus defined in claim 1, further comprising heating means for heating the outer cladding layer operably coupled with said mold means.

3. The apparatus defined in claim 1, wherein said means for applying the outer cladding layer comprises means for coating the core and inner cladding layer with the third reinforcing resin.

4. The apparatus defined in claim 1, wherein said first reinforcing material supply means further comprises means for aligning fibers comprising first reinforcing material prior to its being impregnated with the first resin.

5. The apparatus defined in claim 1, wherein said mold means comprises at least one pair of mating mold halves configured to receive and form the inner and outer cladding layers into the desired configuration.

6. The apparatus defined in claim 1, wherein said means for applying said second thermosetting material comprises a plurality of spools, each of which presents a strand of the second reinforcing material to the core, a resin bath that impregnates the strands of the second reinforcing material, and a second shaping die that forms the inner cladding layer over the core, and wherein said second shaping die is positioned downstream of said means for applying said outer cladding layer.

7. An apparatus for forming reinforcing structural rebar comprising a core of a resin containing reinforcing material and an outer cladding, said apparatus comprising:

resin supply means for supplying a first resin;

a first shaping die including a heater;

means for impregnating a first reinforcing material with the first resin;

means for pulling the resin-impregnated first reinforcing material through the shaping die to form the core of the structural rebar such that the first resin is partially cured by said heater;

material applying means for applying material for the outer cladding of the structural rebar to the core, said material applying means including:

means for applying an uncured inner cladding layer over the partially cured core, said uncured inner cladding layer comprising a second thermosetting resin different from said first thermosetting resin containing a second reinforcing material, said means configured for applying said uncured inner cladding layer second reinforcing material substantially unidirectionally along the longitudinal axis of the core, and means for applying an uncured outer cladding layer over the uncured inner cladding layer, said uncured outer cladding layer comprising a corrosion-resistant third thermosetting resin and inorganic non-unidirectional reinforcing material contained therein, said outer cladding layer applying means including an injection unit for injecting the third resin onto the uncured inner cladding layer and a sleeve having an aperture for receiving the partially uncured core, uncured inner cladding layer, and uncured outer cladding layer, said sleeve aperture being larger than the outer dimension of the uncured inner cladding layer such that said sleeve fails to contact said uncured inner cladding layer, and configured to preform said uncured outer cladding layer to a predetermined dimension; and mold means for molding the uncured outer cladding layer into a desired configuration on the core.

8. The apparatus defined in claim 7, further comprising heating means for heating the outer cladding layer operably coupled with said mold means.

9. The apparatus defined in claim 7, wherein said first reinforcing material supply means further comprises means for aligning fibers comprising first reinforcing material prior to its being impregnated with the first resin.

10. The apparatus defined in claim 7, wherein said mold means comprises at least one pair of mating mold halves configured to receive and form the inner and outer cladding layers into the desired configuration.

11. The apparatus defined in claim 7, wherein said means for applying said second thermosetting material comprises a plurality of spools, each of which presents a strand of the second reinforcing material to the core, a resin bath that impregnates the strands of the second reinforcing material, and a second shaping die that forms the inner cladding layer over the core.

12. The apparatus defined in claim 7, wherein said sleeve aperture is sized so that, as said inner cladding layer passes therethrough, fibers of the second reinforcing material avoid contact with said sleeve.

13. An apparatus for forming reinforcing structural rebar comprising a core of a resin containing reinforcing material, an inner cladding layer, and an outer cladding layer, said apparatus comprising:

(a) a pultrusion station, comprising:

a first reinforcing material supply;

a first resin chamber operably associated with said first material supply for impregnating said first reinforcing material with said resin; and a first shaping die, which includes a heater, for forming the first impregnated reinforcing material into the partially cured core of the structural rebar;

(b) an inner cladding station for applying the uncured inner cladding material of the structural rebar to the partially cured core, said inner cladding station comprising:

a second reinforcing material supply positioned downstream from said first reinforcing material supply;

a second resin chamber containing a thermosetting resin, said second resin chamber operably associated with said second reinforcing material supply for impregnating said second reinforcing material with said second resin, wherein said inner cladding station applies said uncured inner cladding material over the partially cured core, said uncured inner cladding material comprising said second impregnated reinforcing material, and wherein said inner cladding station is configured such that the second reinforcing material is applied substantially unidirectionally along the longitudinal axis of the core;

(c) an outer cladding station for applying an uncured outer cladding layer over uncured inner cladding material, said uncured outer cladding layer comprising a corrosion-resistant third thermosetting resin and non-unidirectional inorganic reinforcing material contained therein, said outer cladding station comprising:
  an injection unit for injecting the third resin onto the uncured inner cladding material; and
  a sleeve having an aperture for receiving the partially cured core, uncured inner cladding layer, and uncured outer cladding layer, said sleeve aperture having an inner diameter larger than the outer diameter of the uncured inner cladding material layer and configured to preform said uncured outer cladding layer to a predetermined dimension, wherein said sleeve aperture is sized such that it does not contact said uncured inner cladding material layer; and (d) a molding station for molding the uncured outer cladding layer and uncured inner cladding material into a desired configuration onto the partially cured core, wherein said molding station includes a heating means configured to concurrently cure the partially cured core, uncured outer cladding material and uncured inner cladding material, whereby said pultrusion station, said inner cladding station, said outer cladding station, and said molding station are operably associated in serial alignment and define a continuous rebar production apparatus.

14. The apparatus defined in claim 13, wherein said molding station comprises at least one pair of mating mold halves configured to receive and form the inner and outer cladding layers into the desired configuration.

15. The apparatus defined in claim 13, wherein said first reinforcing material supply is disposed in at least one creel, and wherein said second reinforcing material supply comprises a plurality of spools, said spools positioned separate and longitudinally apart from said at least one creel, and wherein each of said spools presents a strand of the second reinforcing material to said second resin bath that impregnates the strands of the second reinforcing material prior to unidirectional application to the core.

16. An apparatus for forming reinforcing structural rebar comprising a core of a resin containing reinforcing material and an outer cladding, said apparatus comprising:
  a resin supply means for supplying a first resin;
  a first shaping die including a heater;
  means for impregnating a first reinforcing material with the first resin;
  means for pulling the resin-impregnated first reinforcing material through the shaping die to form the core of the structural rebar such that the first resin is partially cured by said heater;
  material applying means for applying material for the outer cladding of the structural rebar to the partially cured core, said material applying means including:
    means for applying an uncured inner cladding layer over the partially cured core, said uncured inner cladding layer comprising a second thermosetting resin containing a second reinforcing material, the supply and introduction of the second reinforcing material being disposed longitudinally away and separate from the first reinforcing material, said second reinforcing material being applied substantially unidirectionally along the longitudinal axis of the core, and
    means for applying an uncured outer cladding layer over the uncured inner cladding layer, said uncured outer cladding layer comprising a corrosion-resistant third thermosetting resin and a third non-unidirectional reinforcing material contained therein; and
  mold means configured for molding the uncured outer cladding material into a desired configuration on the core, wherein said mold means includes a curative heating element configured to concurrently cure said partially cured core, uncured inner cladding layer, and uncured outer cladding layers.

* * * * *